United States Patent [19]

Zechnall

[11] Patent Number: 5,146,219
[45] Date of Patent: Sep. 8, 1992

[54] DEVICE FOR THE OUTPUT OF SAFETY-RELATED ROAD INFORMATION IN LOCATING AND NAVIGATING SYSTEMS OF LAND VEHICLES

[75] Inventor: Wolf Zechnall, Hildesheim, Fed. Rep. of Germany

[73] Assignee: Robert Bosch GmbH, Stuttgart, Fed. Rep. of Germany

[21] Appl. No.: 637,060

[22] Filed: Jan. 3, 1991

Related U.S. Application Data

[63] Continuation of Ser. No. 392,926, Jul. 7, 1989, abandoned.

[30] Foreign Application Priority Data

Jan. 10, 1987 [DE] Fed. Rep. of Germany ....... 3700552

[51] Int. Cl.$^5$ ............................................. G08G 1/123
[52] U.S. Cl. ..................... 340/995; 340/905; 364/424.01
[58] Field of Search ............... 340/990, 995, 996, 988, 340/905, 460; 364/449, 444, 424.1, 426.01, 426.04

[56] References Cited

U.S. PATENT DOCUMENTS

| | | | |
|---|---|---|---|
| 4,646,089 | 2/1987 | Takanabe et al. | 340/995 |
| 4,679,147 | 7/1987 | Tsujii et al. | 364/449 |
| 4,812,845 | 3/1989 | Yamada et al. | 340/995 |
| 4,812,980 | 3/1989 | Yamada et al. | 340/990 X |
| 4,905,786 | 3/1990 | Miyake et al. | 364/424.04 X |
| 4,937,751 | 6/1990 | Nimura et al. | 364/449 |

*Primary Examiner*—Jin F. Ng
*Assistant Examiner*—Brian R. Tumm
*Attorney, Agent, or Firm*—Michael J. Striker

[57] ABSTRACT

The invention provides an information output device for a computerized locating and navigating system of motor vehicles which, in addition to stored geographical data of an electronic road map, delivers safety related information concerning determined sections of road. The information is stored and given out, e.g. optically or acoustically, when reaching the sections of road.

5 Claims, 1 Drawing Sheet

DEVICE FOR THE OUTPUT OF SAFETY-RELATED ROAD INFORMATION IN LOCATING AND NAVIGATING SYSTEMS OF LAND VEHICLES

This is a continuation of application Ser. No. 392 926 filed Jul. 7, 1989, now abandoned.

BACKGROUND OF THE INVENTION

The invention is directed to a device for the output of safety-related road information in computerized locating and navigating systems of land vehicles.

Drivers of land vehicles, particularly passenger vehicles or trucks, obtain road information by means of traffic signs which are posted on the edge of the road, at bridge-like carriers over the roads, or as highway markings.

For drivers unacquainted with the location, the flood of information which they must evaluate for their orientation is so great that they easily overlook important information, particularly danger signs, or drive so slowly that they impede or endanger the flowing traffic. But even when particularly attentive, it may happen that drivers can not perceive traffic signs because they are soiled or hidden by stopped vehicles or vehicles driving alongside or are destroyed in a traffic accident.

Indications of nursery schools, schools, homes for the aged and the blind, grades, construction sites, underpasses, curves, and the like are mentioned as examples. In most cases, overlooking information does not lead to consequential damages, but through an unfortunate chain of events the lacking information can be a decisive contributing factor of an accident.

SUMMARY OF THE INVENTION

The invention has the object of improving driving safety by means of safety related road information which is independent of irrelevant environmental and traffic factors.

This object is met in a computerized locating and navigating system of land vehicles including an electronic road map data storage, an entry terminal for a starting position and destination data, sensor for delivering driving data of a vehicle, particularly driving direction and speed, by means of a device for the output of safety-related information, which includes an additional storage for safety-related information about determined sections of the electronic road map; a correlation circuit for correlating the data from the additional storage with output data from the locating and navigating system; an input-output circuit coupled to the output of the correlation circuit, and to the sensors to output in dependency on the driving data and output signals of the correlation circuit an additional safety-related signal.

Due to the storage of the safety related data, the output of information to the driver is independent of the actual traffic sign infrastructure. Neither environmental conditions, e.g. dazzling by the sun, rain, fog, snow, darkness, nor traffic factors, e.g. vehicles blocking the view, damaged signs or distraction of the driver by means of diverting billboards, impair the output of information. Because of the restriction to essential information, the ability to pay greater attention is increased. Information which is important for those unfamiliar with the location but which is not viewed by the local traffic authorities as worthy of being indicated by means of traffic signs can also be included in the stored safety related data.

An output of information relating to the specific situation can be effected by means of including driving and environmental data. This relates e.g. to warnings of the risk of skidding or slippery ice whose corresponding signs are posted year round, but which are only meaningful during a few days and are overlooked by many drivers. Sharp curves, grades, transverse ruts or narrowing of the road, which can cause difficult situations for the driver only when he approaches them at high speed and are accordingly only worth indicating at that time, must be noted in addition.

Safety related information can be stored in the additional storage independently of the traffic sign infrastructure. The storage can be updated as needed. This information can be given to the driver independently of environmental conditions. For this purpose, an optical LCD display as well as an acoustic voice synthesizer, preferably in connection with the car radio, can serve as an output unit.

By means of correlation with the geographical data of an electronic road map, the output can be effected precisely and only when the driver approaches the respective section of road and when it can be detected that he will drive through it. For this purpose, the input-output circuit is controlled by means of the correlation circuit, so that the stored information for activating the output unit can be switched through.

Further, it is also possible to evaluate driving and environmental data. For this purpose, sensors and/or an entry terminal are provided, by means of which the current driving and environmental data are fed to a comparator. Recommended driving data are obtained from the stored safety related data by means of a converter circuit and are likewise fed to the comparator. Instructions can be given to the driver, e.g. to reduce speed, by means of the comparison of both data when predetermined limits are exceeded. As a further development of this step, control commands can also be transmitted to vehicle units, e.g. to shift the automatic transmission to a lower selection range during grades.

Special information which has been selected by the driver beforehand can also be issued or suppressed by means of the evaluating circuit.

Advantageous developments of the information output system follow from the further description, and the drawing which illustrates an embodiment example of the invention.

DESCRIPTION OF THE PREFERRED EMBODIMENT

Figure 1:
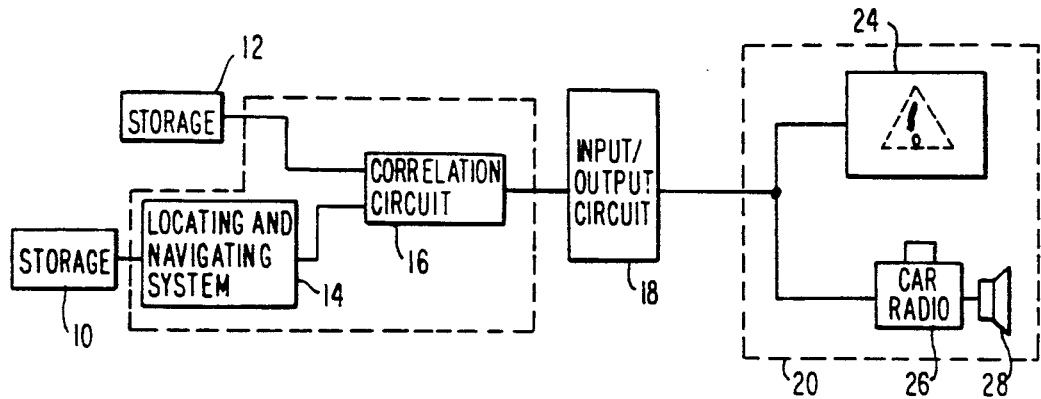
FIG. 1 shows an information output system which obtains safety related information by means of correlation with data of an electronic road map and transmits it optically and acoustically.

The information output device shown in FIG. 1 is limited substantially to the basic ideas of the invention. It comprises an additional storage 12 in which safety related information concerning determined sections of road is stored. A locating and navigating system 14 for land vehicles, known per se, and a corresponding storage 10 for geographical data of an electronic road map are provided as additional component parts. A correlation circuit 16, which is connected to a route information input-output circuit 18, serves to evaluate both stored data. An output unit 20, which comprises a LCD display 24 for graphic symbols and characters as well as a car radio 26, known per se, in connection with a voice synthesizer and a loudspeaker 28, is connected downstream of the input-output circuit 18. The system described in Bosch Technical Reports, volume 8 (1986/-) issue ¼, pages 7-14; Neukirchner, Zechnall, "EVA-An Autonomous Locating and Navigating System for Land Vehicles", for example, can serve as locating and navigating system. In this system, the road network data which have been empirically determined beforehand by means of test vehicles are stored in the form of an electronic, digitized road map. The driver then enters his starting position and destination via an entry terminal. During the trip, location data are obtained via wheel sensors, from which the current position of the vehicle is determined from the length and direction. Instructions concerning the driving direction are then given to the driver by means of comparing this data with the stored data.

Safety related data are located in the additional storage 12. This can be the same information which is also to be conveyed to the driver by means of physical danger signs at the edge of the road. However, information which is not contained in traffic signs but which is advisable for the purpose of increasing the traffic safety of drivers unacquainted with the location can also be stored in addition. Moreover, the instructions can also be coupled with recommendations, e.g. not to exceed a certain speed, to shift in a determined transmission selection range, to turn lights on or off, to activate the turning signals or to pay attention to particularly dangerous road or traffic configurations.

When driving over sections of road, this additionally stored safety related information is correlated with the current location data of the locating and navigating system 14. When the driver reaches a section of road for which corresponding safety related information is stored, this information is transmitted from the correlation circuit 16 to the output unit 20 via the input-output circuit 18. For example, in this instance the traffic sign can be formed as a symbol on the LCD display 24 or announced in plain language via the car radio 26 provided with the voice synthesizer and a recommendation can be made. For example, in the case of a curve this could be: "Attention right-hand curve, maximum speed 80 kilometers per hour."

Similar information can also be given for sections of road with schools, nursery schools, or homes for the aged or blind, since it is to be expected that persons in these areas are at a higher risk of not always correctly estimating the traffic situation. Also, grades, underpasses, slopes or dangerous narrowed portions of road can be referred to.

The information assigned to this section of road is often only relevant for one traveling direction. The corresponding information is then advisably also indicated in a manner relating to the specific direction only for the relevant traveling direction.

In contrast to stationary traffic signs, it can be advisable to provide the driver with safety related information already beforehand as a function of his driving speed. If the driver is traveling over a stretch of road during a time when there is little traffic, where a higher speed is also allowable, the indication must be effected as early as possible so that the driver has corresponding time to react. If, on the other hand, the driver is in backed up traffic, early information is pointless, since he can already have forgotten it again due to intervening events by time it becomes critical for him.

Figure 2:
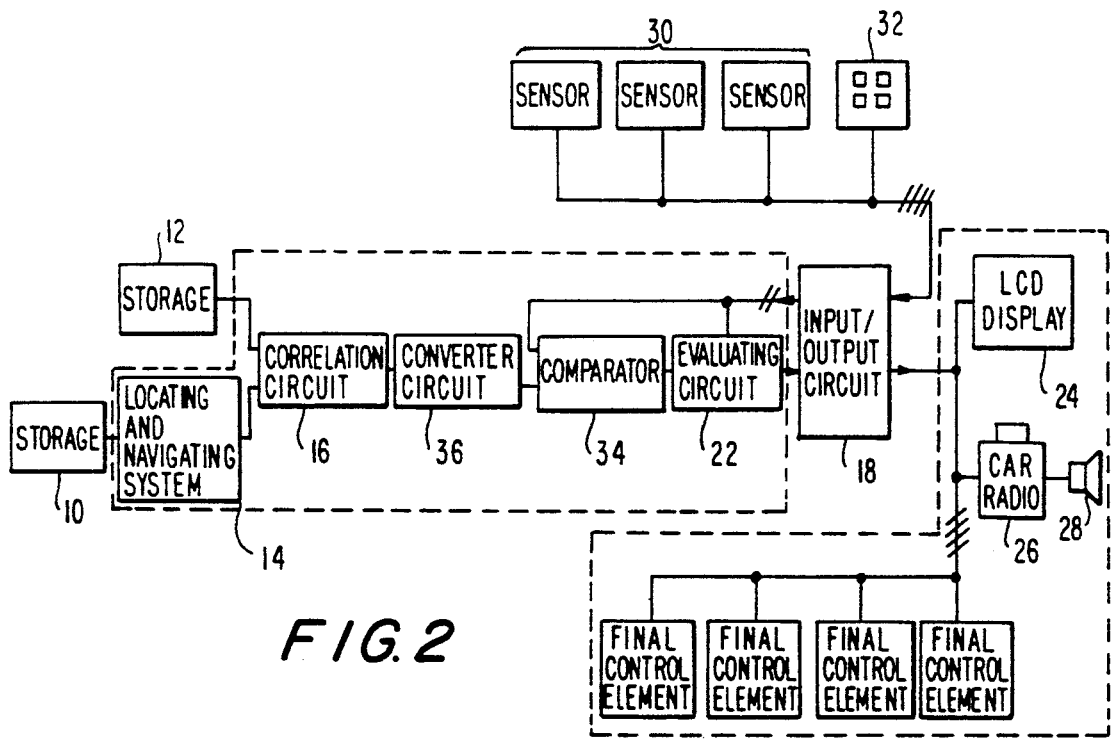
FIG. 2 shows an information output system as in FIG. 1, but with sensors, an entry terminal and final control elements in addition.

In order to avoid an unnecessary flood of information and to inform in a more directed and precise manner, the information output system, according to the embodiment example described above, can be added to in a corresponding manner. In this respect, FIG. 2 is referred to.

In this instance, the output signal of the correlation circuit 16 arrives at the input-output circuit 18 via a converter circuit 36, a comparator 34 and an evaluating circuit 22. The comparator 34 and the evaluating circuit 22 are connected with sensors 30 and an entry terminal 32 via control or signal lines. The output unit 20 additionally comprises final control elements 38 which act on the vehicle units.

Data which can be selected beforehand can be demanded or suppressed by means of the evaluating circuit 22. Thus, for example, locations of filling stations, kiosks, police, pharmacies, post offices, banks can also be stored. If the driver wants a corresponding facility to be brought to his attention on the way between his starting position and his destination, he can select this via the entry terminal 32. When reaching the corresponding stretch of road the selected facility will be brought to his attention promptly in such a way that he can seek a corresponding exit or parking place and can bring his intention of stopping or turning to the attention of the following traffic. On the other hand, warnings about slippery ice or skidding can be suppressed if such dangers can be ruled out on the basis of the weather and the corresponding warning instructions would be experienced as an annoyance.

In addition to the manual input by means of the entry terminal 32, driving and environmental data can also be acquired automatically. This is effected via the sensors 30. The sensors can be distance and speed sensors, sensors of the transmission selection range, of the vehicle weight or also of the outside temperature. On the other hand, data concerning the vehicle height, vehicle length or the trailer operation can be entered via the entry terminal in an advisable manner.

The data obtained via the entry terminal 32 or sensors 30 is fed to the comparator 34 which obtains simultaneously recommended driving data via the converter circuit 36 which obtains this data from the output data of the correlation circuit 16. When the driver reaches a section of road with a sharp curve, for example, this fact in itself being stored on the one hand and a recommended speed being stored on the other hand, the comparator 34 determines whether or not the current speed lies above or below the recommended speed. If it is far below the recommended speed, there is advisably no warning; if, on the other hand, it lies above the recommended speed, the driver's attention is drawn to the curve and the recommended speed.

A similar decision concerning whether or not warning information is given can also be effected during grades. Factors such as trailer operation or great weight are taken into consideration, which would possibly lead to a shorter braking delay.

The outside temperature could also be determined by means of temperature sensors and a criterion could be found as to whether or not instructions about slippery ice are to be given. For vehicles with particularly great weight or particularly high construction, restrictions also apply when passing across bridges or through underpasses. An insufficient carrying capacity of a bridge or an insufficient overhead of an underpass can be particularly brought to the driver's attention if necessary by means of the addition of the information output system.

In addition, the safety related information can also be utilized for controlling final control elements 38 which activate various functional units of the vehicle. Of course, this control should be effected with corresponding care so as not to create dangerous situations which are supposed to be prevented by means of the control in itself.

A control effected by means of a final control element could be e.g. turning on the light when driving into tunnels or underpasses, shifting an automatic transmission into a lower selection range on grades, or also reducing the speed maintained by a cruise control. In critical situations, the brakes could also be actuated should circumstances show that the driver is in a dangerous situation which is otherwise no longer controllable.

Such information can be conveyed exclusively to the final control elements 38 for executing control commands, but it is advisable that it be transmitted in addition to an optical or acoustic output.

It is not necessary to construct the function blocks shown discretely in FIGS. 1 and 2 as discrete circuits. On the contrary, these function blocks can also be realized by means of a program controlled computer 40. This makes it possible for other tasks to be carried out by the computer and accordingly makes it possible to dimension the realization in terms of circuit technology in such a way that it can be easily accommodated in passenger vehicles or trucks. A compact disk containing the storages 10 and 12 in the form of a mass storage can be used as storage 12, as it is in the "EVA" locating and navigating system.

I claim:

1. A computerized locating and navigating system of land vehicles including an electronic road map data storage, an entry terminal for starting position data, destination data and vehicle type data, sensors for delivering driving data of an operating vehicle, particularly driving direction and speed, said system comprising a device for selectively outputting safety-related information produced in the vehicle in dependency on driving conditions of the vehicle, the device comprising an additional storage for the safety-related information about determined sections of the road map, a correlation circuit for correlating the safety-related information from the additional storage with the output data from the locating and navigating system; a safety-related information selecting circuit coupled to an output of the correlation circuit and to the sensors to output in dependency on the driving data and signals of the output of the correlation circuit those of the safety-related signals from said additional storage which are relevant to the momentary driving conditions of the vehicle, and to suppress the output of irrelevant ones of the safety-related signals and to release a warning signal when the actual driving data of the operating vehicle deviates from the relevant safety-related signals from said additional storage, said information selecting circuit including a route information input-output circuit having an input connected to the sensors, a comparator having an input connected via a converter to an output of the correlation circuit and another input connected to an output of the route information input-output circuit, and an evaluation circuit having an input connected to said output of the route information input-output circuit, another input connected to an output of the comparator, and an output connected to another input of the route information input-output circuit for controlling the delivery of the safety-related information at another output of the route information input-output circuit; and final control elements for cruise control, transmission range selection, brakes and lights controlled by the output of the safety-related information.

2. A navigation system as defined in claim 1, further comprising an output unit connected to the other output of the route information input-output circuit and including means for optically displaying and/or acoustically transmitting the output safety-related signal.

3. A navigation system as defined in claim 1, wherein the vehicle type data include vehicle weight, height, length, and trailer operation.

4. A navigation system as defined in claim 1, wherein the time of delivery of the output safety-related signal depends on the driving speed.

5. A navigation system as defined in claim 4, wherein the output safety-related signal depends on driving direction.

* * * * *